United States Patent
Schubert et al.

(10) Patent No.: US 6,742,034 B1
(45) Date of Patent: May 25, 2004

(54) METHOD FOR STORAGE DEVICE MASKING IN A STORAGE AREA NETWORK AND STORAGE CONTROLLER AND STORAGE SUBSYSTEM FOR USING SUCH A METHOD

(75) Inventors: Karl D. Schubert, Austin, TX (US); Stephen G. Luning, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/464,843

(22) Filed: Dec. 16, 1999

(51) Int. Cl.[7] .................. G06F 15/173; G06F 12/00
(52) U.S. Cl. ................. 709/226; 709/214; 711/6; 711/100
(58) Field of Search ................... 709/229, 226, 709/223, 224, 214; 711/152, 6, 100; 712/5

(56) References Cited

U.S. PATENT DOCUMENTS

| | | | |
|---|---|---|---|
| 5,432,735 A | 7/1995 | Parks et al. ............... 365/168 |
| 5,619,728 A | 4/1997 | Jones et al. ............... 395/847 |
| 5,657,445 A | 8/1997 | Pearce ...................... 395/186 |
| 5,692,219 A | 11/1997 | Chan et al. ............... 395/869 |
| 5,694,615 A * | 12/1997 | Thapar et al. .............. 710/2 |
| 5,727,218 A | 3/1998 | Hotchkin .................. 395/733 |
| 5,761,424 A | 6/1998 | Adams et al. ........ 395/200.47 |
| 5,812,754 A | 9/1998 | Lui et al. ............... 395/182.04 |
| 5,931,958 A | 8/1999 | Bouvier et al. ............ 714/48 |
| 5,978,860 A | 11/1999 | Chan et al. ................ 710/8 |
| 5,987,506 A | 11/1999 | Carter et al. .............. 709/213 |
| 5,996,013 A * | 11/1999 | Delp et al. ............... 709/226 |
| 5,996,014 A | 11/1999 | Uchihori et al. ........... 709/226 |
| 5,996,075 A | 11/1999 | Matena .................... 713/200 |
| 6,160,813 A * | 12/2000 | Banks et al. .............. 370/422 |
| 6,353,612 B1 * | 3/2002 | Zhu et al. ................. 370/360 |
| 6,438,595 B1 * | 8/2002 | Blumenau et al. ......... 709/226 |
| 6,470,007 B1 * | 10/2002 | Berman ..................... 370/351 |
| 2001/0008010 A1 * | 7/2001 | Sanada et al. ............. 711/152 |
| 2002/0069335 A1 * | 6/2002 | Flyinn, Jr. ................ 711/153 |

FOREIGN PATENT DOCUMENTS

| | | | |
|---|---|---|---|
| EP | 0 858 036 A2 | 4/1998 | ........ G06F/13/42 |
| EP | 0 881 560 A2 | 5/1998 | ........ G06F/1/00 |
| JP | 08288333 | 10/1996 | ........ G11B/19/02 |
| JP | 0881560 A2 * | 12/1998 | |
| WO | WO 99/34297 | 12/1998 | ........ G06F/13/00 |
| WO | WO 9934297 * | 7/1999 | |

OTHER PUBLICATIONS

Cross–platform networking gets easier and more complicated, Liebman, Nov. 1998, Videography.*
CPU cache prefetching: Timing evaluation of hardware implementations, Tse et al, May 1998, IEEE transactions on computers, vol. 47, pp. 509–526.*
White Paper entitled "Consolidating Data Storage for Multiple Microsoft® Windows NT® Servers"0 by Janet Berlind; Dell Computer Corporation; Mar. 1999; <http://www.dell.com/r&d/highlights/spring99/storage.htm>, Printed Aug. 24, 1999.
White Paper entitled "Storage Area Network (SAN) Solutions" Feb. 1999, Dell Computer Corporation.
White Paper entitled "Designing Fibre Channel Fabrics for Storage Area Networks", by Tom Kocis and Jim Marrone; Dell Computer Corporation; Apr. 1999; <http://dell.com/r&d/wp/spring99/fchannel.htm>, Printed Aug. 24, 1999.

(List continued on next page.)

*Primary Examiner*—Krisna Lim
(74) *Attorney, Agent, or Firm*—Baker Botts L.L.P.

(57) ABSTRACT

A method for masking logical storage devices from a host on a storage area network and a storage controller and storage system for using such a method are disclosed. The method includes receiving instructions for associating a subset of a plurality of logical storage devices with a particular host. A request from the particular host is received. The request includes a request for identification of available logical storage devices. The request is responded to by identifying the subset of logical storage devices as available.

46 Claims, 2 Drawing Sheets

OTHER PUBLICATIONS

White Paper entitled "Storage Area Network (SAN) Technology", Dell Computer Corporation, Advanced Technology Group Aug., 1998, Aug. 1999.

Vectors White Paper, "Fibre Channel RAID Storage Performance" by Ahmad Tawil and Tom Bates, Jul. 1999, Printed Dec. 16, 1999.

Vectors White Paper, "Network Attached Storage" Dell Computer Corporation, May 1999, Printed Dec. 16, 1999.

U.S. Pending patent application Ser. No. 08/910,703 entitled "System and Method for Disabling and Re–Enabling at Least One Peripheral Device in a Computer System by Masking a Device–Configuration–Space–Access–Signal with a Disable or Re–Enable Signal"; Dell USA, L.P., Filed Aug. 13, 1997.

U.S. Pending patent application Ser. No. 08/984,386 entitled "System and Method for Changing Partition Mappings to Logical Drives in a Computer Memory" by Alan E. Beelitz; Dell USA, L.P., Filed Dec. 3, 1997.

U.S. Pending patent application Ser. No. 08/950,545 entitled "System and Method for Updating Partition Mappings to Logical Drives in a Computer Memory Device" by Alan E. Beelitz ; Dell USA, L.P., Filed Oct. 15, 1997.

U.S. Pending patent application Ser. No. 09/198,701 entitled "Computer System and Method for Accessing a Computer–Readable Medium" by Alan E. Beelitz ; Dell USA, L.P., Filed Nov. 24, 1998.

U.S. Pending patent application Ser. No. 08/837,181 entitled "Intelligent Backplane for Serial Storage Architectures" by Jeffries, et al.; Dell USA, L.P., Filed Apr. 11, 1997.

U.S. Pending patent application Ser. No. 08/947,138 entitled "System and Method for Simulating a Computer Storage Device" by Alan E. Beelitz; Dell USA, L.P., Filed Oct. 8, 1997.

U.S. Pending patent application Ser. No. 09/100,048 entitled "Selective Isolation of a Storage Subsystem Bus Utilizing a Subsystem Controller" by Li, et al.; Dell USA, L.P., Filed Jun. 19, 1998.

U.S. Pending patent application Ser. No. 09/237,413 entitled "Method and Apparatus for Mapping Hard Disk Partitions and Block Devices to Logical Drives in a Computer System" by Alan E. Beelitz ; Dell USA, L.P., Filed Jan. 26, 1999.

U.S. Pending patent application Ser. No. 09/330,725 entitled "Method and System for Establishing a Storage Area Network Configuration" by Ahmad Hassan Tawil; Dell USA, L.P., Filed Jun. 11, 1999.

White Paper entitled "Consolidating Data Storage for Multiple Microsoft® Windows NT® Servers" by Janet Berlind; Dell Computer Corporation; Mar. 1999; <http://www.dell.com/r&d/highlights/spring99/storage.htm>, Printed Aug. 24, 1999.

White Paper entitled "Storage Area Network (SAN) Solutions" Feb. 1999, Dell Computer Corporation, Feb., 1999.

White Paper entitled "Designing Fibre Channel Fabrics for Storage Area Networks", by Tom Kocis and Jim Marrone; Dell Computer Corporation; Apr. 1999; <http://dell.com/r&d/wp/spring99/fchannel.htm>, Printed Aug. 24, 1999.

White Paper entitled "Storage Area Network (SAN) Technology", Dell Computer Corporation, Advanced Technology Group, Aug. 1999.

Vectors White Paper, "Fibre Channel RAID Storage Performance" by Ahmad Tawil and Tom Bates, Jul. 1999, Printed Dec. 16, 1999.

Vectors White Paper, "Network Attached Storage" Dell Computer Corporation, May 1999, Printed Dec. 16, 1999.

* cited by examiner

METHOD FOR STORAGE DEVICE MASKING IN A STORAGE AREA NETWORK AND STORAGE CONTROLLER AND STORAGE SUBSYSTEM FOR USING SUCH A METHOD

TECHNICAL FIELD OF THE DISCLOSURE

The present disclosure relates in general to the field of computer storage systems and, more particularly, to a method for storage device masking in a storage area network and a storage controller and storage subsystem for using such a method.

BACKGROUND OF THE DISCLOSURE

The demand for data storage capacity in computer networking environments increases dramatically each year. One of the reasons driving such demand is an increase in the number of data-intensive tasks conducted over networking environments. Example of such tasks include multimedia applications, data warehousing, online transaction processing, and medical imaging. Along with this need for increased storage capacity, users demand faster access to the data and the ability to share pooled data among a large number of users. In addition to these demands, many network operators desire the ability to efficiently change the amount of storage available to a network and to more efficiently provide maintenance to the existing storage.

A storage area network (SAN) is a network developed to address many of the above concerns. A conventional SAN includes a collection of data storage devices (also known as a "storage pool") communicatively coupled to a plurality of hosts such as workstations and servers. The storage devices in a SAN can be co-located, which allows for easier maintenance and easier expandability of the storage pool. In the present disclosure, the term "host" and "server" are used interchangeably, with the understanding that a "server" is one type of "host."

The hosts can access the storage pool using Fibre Channel protocol, which functionality is generally well known. The Fibre Channel protocol can serve as a common physical layer to transport multiple upper layer protocols such as SCSI, IP, HiPPI, and others. In such a system, the hosts and the data storage devices are connected to a Fibre Channel "fabric."

A SAN can be configured such that hosts access the data storage devices through the fabric using small component system interconnect (SCSI) protocol. The SCSI protocol assigns logical unit numbers (LUNs) to the data storage devices. The hosts can then access the data storage devices by reference to the SCSI LUNs.

A SAN can have flexibility in assigning LUNs to data storage devices in a data storage pool. For example, a single data storage device may have more than one LUN. Alternatively, if multiple data storage devices are grouped into RAID volume, a single LUN can be assigned to the RAID volume.

One problem with conventional SANs arises if a server coupled to the SAN uses the MICROSOFT WINDOWS NT operating system. When a server operating under WINDOWS NT boots, the operating system automatically assigns all visible storage to the server. For example, if a particular server detects several LUNs, it will assume each LUN is available for its use. Therefore, if multiple WINDOWS NT servers are attached to a storage pool, each server can attempt to take control of each LUN in the storage pool. This situation can lead to conflicts when more than one server attempts to access the same LUN.

One conventional solution to the above problem is placing masking software on each server in the SAN. For example, one such masking software solution is the OPENMANAGE STORAGE CONSOLIDATION SOFTWARE, manufactured by DELL COMPUTER CORPORATION. This software permits up to four Windows NT servers to share a common data storage pool without access conflicts, and allows storage to be reapportioned among servers without taking the servers off-line. The storage consolidation software runs in each WINDOWS NT server and masks particular LUNs from the server, which prevents the operating system from assigning that LUN.

There are several technical difficulties with placing masking software on each server attached to the SAN. First, the software must be installed on each server connected to the fabric. Such a requirement is inefficient and can lead to configuration management problems as well as data corruption if the masking software is inadvertently left off of a host connected to the fabric. Furthermore, due to this problem, resources must be expended to periodically check the configuration of each server attached to the SAN.

Another difficulty with such a solution arises when servers employing operating systems other than WINDOWS NT, such as NETWARE or UNIX, are attached to the SAN. In such a SAN, the masking software must be ported to operate with each different operating system.

SUMMARY OF THE DISCLOSURE

In accordance with the present disclosure, a method and systems using the method for storage device masking in a storage area network are disclosed that provide significant advantages over prior developed systems. The present embodiments can place masking capability at a central location and avoid the need to place masking capability on each host attached to a SAN.

According to one aspect of the present disclosure, a method includes receiving instructions for associating a subset of a plurality of logical storage devices with a particular host. A request from the particular host is received. The request includes a request for identification of available logical storage devices. The request is responded to by identifying the subset of logical storage devices as available.

According to another aspect of the present disclosure, a storage controller using a method for storage device masking includes a CPU. A computer readable medium is coupled to the CPU. An adapter is also coupled to the CPU, the adapter for interfacing to a fabric of a storage area network (SAN). Further coupled to the CPU is a storage interface for interfacing with a storage pool. The storage pool can be a plurality of logical storage devices. The storage controller also includes a masking engine stored upon the computer readable medium. The masking engine includes instructions operable to be executed by the CPU. The masking engine is operable to receive instructions for associating a subset of the plurality of logical storage devices with a particular host coupled to the fabric. The masking engine is further operable to receive a request from the particular host requesting identification of available logical storage devices. The masking engine is also operable to respond to the request by identifying a LUN of the subset of logical storage devices as available.

According to a further aspect of the present disclosure, a storage subsystem includes a plurality of physical storage devices coupled to the adapter of a storage controller as recited above. The plurality of physical storage devices are arranged into a plurality of logical storage devices.

According to an additional aspect of the present disclosure, a fiber channel switch includes a CPU and a computer readable medium coupled to the CPU. A port is coupled to the CPU for interfacing to a computing device to form a fibre channel network. A masking engine is stored upon the computer readable medium. The masking engine includes instructions operable to be executed by the CPU. The masking engine is operable to receive instructions for associating a subset of a plurality of logical storage devices with a particular host coupled to the fibre channel network. The masking engine can further recognize a request from the particular host. The request can be for identification of available logical storage devices. The masking engine can then modify a response to the request such that the response identifies the subset of logical storage devices as available.

It is a technical advantage of the present disclosure that it performs the masking features required when certain hosts are connected to a SAN. This eliminates the need for masking software on each host connected to a SAN.

It is another technical advantage that it eliminates the need to port masking software to different operating systems when operating a SAN with hosts running multiple types of operating systems. This in turn allows for increased scalability of SANs and reduces the resources necessary to maintain and upgrade a SAN.

Other technical advantages should be apparent to one of ordinary skill in the art in view of the specification, claims, and drawings.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE DISCLOSURE

Figure 1:
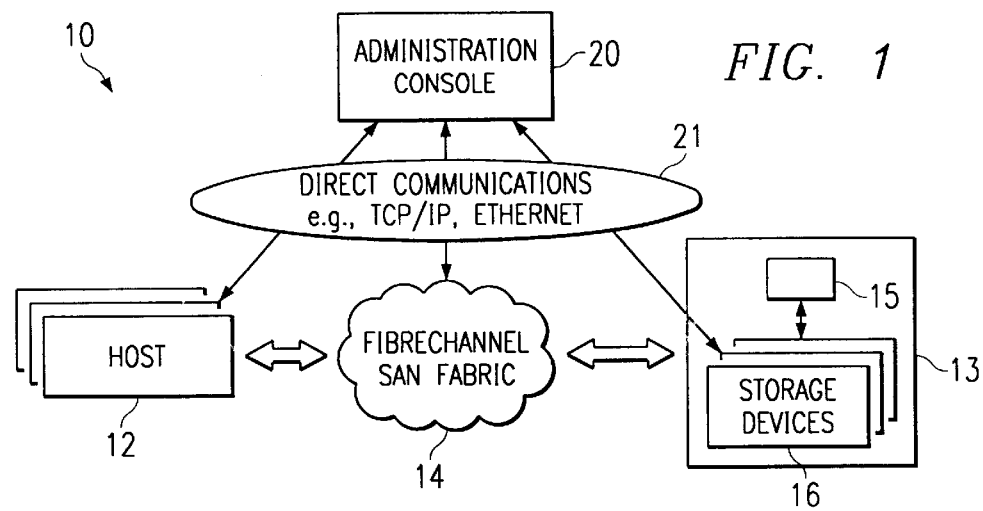
FIG. 1 is a general block diagram of a storage area network including one embodiment of a masking engine.

FIG. 1 is a general block diagram of a storage area network (SAN), indicated generally at 10, including one embodiment of a masking engine. SAN 10 includes hosts 12 and a storage pool 13 coupled to a fabric 14. Hosts 12 can include, for example, servers, workstations, or other network computing devices. Storage pool 13 can include, for example, a plurality of physical storage devices 16 such as hard disk drives under the control of and coupled to one or more storage controllers 15. SAN 10 further includes an administration console 20 coupled to hosts 12, storage pool 13, and SAN fabric 14. For example, administration console 20 can couple to hosts 12, fabric 14 and storage pool 13 through a direct communications link 21 such as a TCP/IP connection or Ethernet cabling. A masking engine is stored upon storage pool 13 and can communicate with administration console 20, physical storage devices 16, and fabric 14.

In operation, hosts 12 communicate with and can transfer data to and from storage pool 13 through fabric 14. For example, through fibre channel protocol, hosts 12 can use storage pool 13 as local storage even though storage pool 13 is remote from hosts 12. As is commonly known, the fibre channel protocol supports SCSI protocol, further allowing hosts 12 to treat storage pool 13 as localized storage. As is further commonly known, in such a scenario physical storage devices 16 of storage pool 13 can be grouped into RAID volumes and each volume assigned a SCSI logical unit number (LUN) address. Alternatively, each physical storage device 16 can be assigned one or more LUNs. Hosts 12 can then use LUNs to address storage pool 13. In such a way, the available physical storage of storage pool 13 is mapped into a plurality of logical storage devices.

Further in operation, administration console 20 can interface with a user to allocate available storage in storage pool 13 to particular hosts 12. In one embodiment, administration console 20 can be software executing on a computing platform, such as a stand alone personal computer (PC). In other embodiments, administration console 20 can be software executing on other computing platforms that are part of the SAN 10, such as one of the hosts 12, a switch in fabric 14, or on storage pool 13. Further to an embodiment wherein hosts 12 use LUN addressing to access storage pool 13, administration console 20 can recognize hosts 12 and assign appropriate LUNs of storage pool 13 to particular hosts 12.

Conventionally, as discussed in the background of this disclosure, a system such as SAN 10 requires specialized software running on each of hosts 12 to address the situation whereby a particular host 12 operates under a WINDOWS NT operating system. As previously described, such specialized software was required because a WINDOWS NT host would attempt to take control of all storage made available to it, leading to compatibility problems and possible contention problems among the shared storage pool 13. The embodiment of FIG. 1 eliminates the need for such specialized software on each of hosts 12.

Storage pool 13 include a masking engine. For example, the masking engine can include software executing on storage controller 15. The masking engine is operable to receive instructions from administration console 20. The instructions can associate a particular host 12 to a subset of the available logical storage devices of storage pool 13. When that particular host 12 requests an identification of all available logical storage devices, masking engine 20 then responds by identifying only the subset. In such a way, the masking engine "masks" other available logical storage devices, preventing the particular host from attempting to take control of the other logical storage devices. The operation of SAN 10 including a masking engine, and the operation of the masking engine is more particularly described with reference to FIGS. 2, 3, and 4 and accompanying description.

Figure 2:
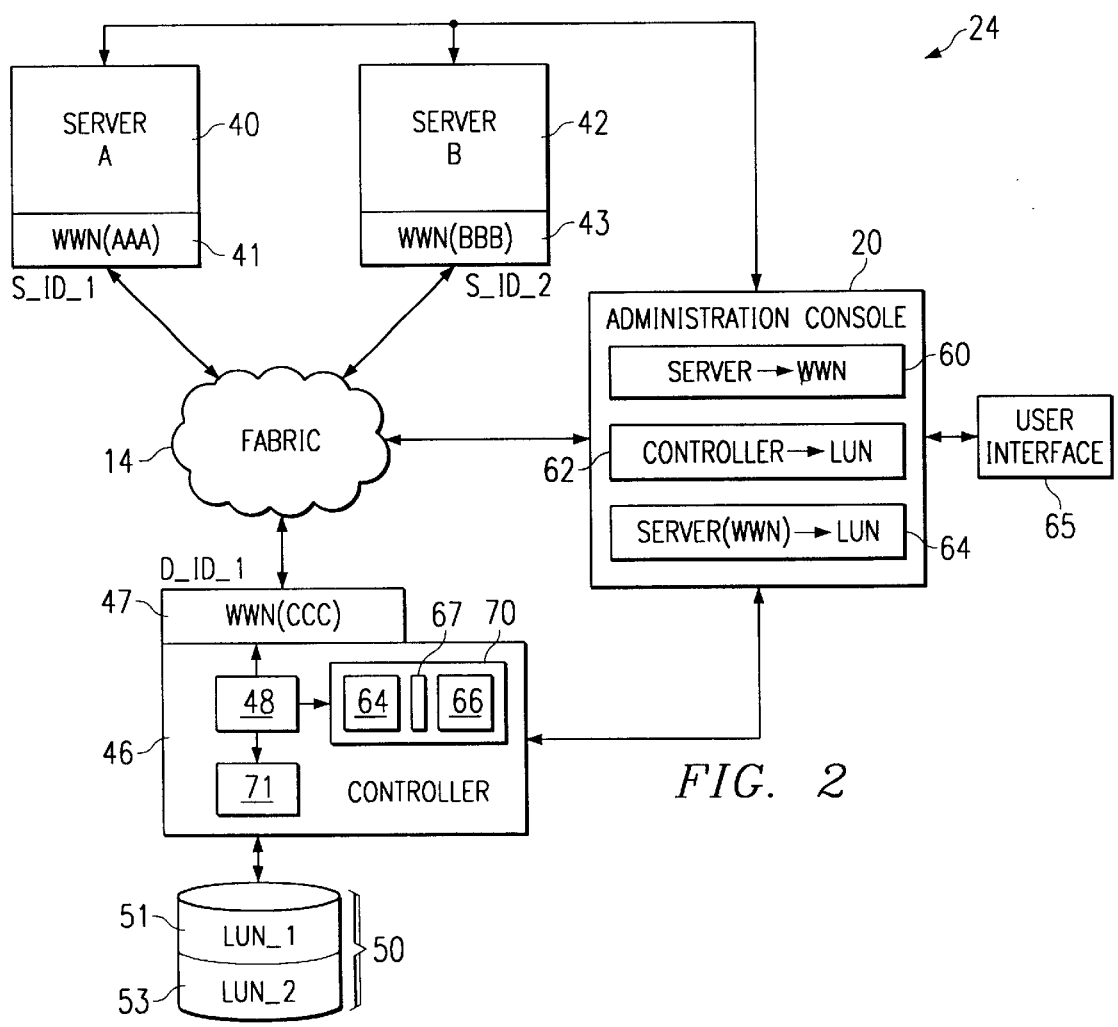
FIG. 2 is a component diagram of a storage area network including one embodiment of a storage controller having a masking engine.

FIG. 2 is a component diagram of a storage area network including a storage controller having a masking engine. The storage area network, indicated generally at 24, includes servers 40 and 42 coupled to fabric 14. SAN 24 further includes a storage controller 46 coupled to fabric 14 and a physical storage device 50 coupled to storage controller 46. An administration console 20 couples to servers 40, 42, fabric 14 and storage controller 46.

Servers 40 and 42 can be computing platforms operating WINDOWS NT or other operating systems. Server 40 includes an adapter 41 for interfacing to fabric 14 and allowing fibre channel communications. Similarly, server 42 includes adapter 43.

Storage controller 46 and physical storage device 50 can be referred collectively as a storage pool (see storage pool 13 of FIG. 1) or a "storage subsystem". Physical storage device 50 of FIG. 2 can be, for example, a single disk drive, a plurality of hard disk drives, or other computer readable medium intended for data storage. Storage controller 46 includes an adapter 47 for interfacing to fabric 14 and allowing fibre channel communications. In the embodiment of FIG. 2, storage controller 46 further includes a central processing unit (CPU) 48 coupled to adapter 47, a computer readable medium 70 coupled to the CPU, and a storage interface 71 coupled to the CPU. Storage interface 71 interfaces with physical storage device 50. A masking engine 66 is stored upon the computer readable medium. Masking engine 66 includes instructions operable to be executed by CPU 48.

Administration console 20 can be, for example, software executing and residing on a stand alone PC or other computing platform. In other embodiments, administration console 20 can be software executing on storage controller 46. In the embodiment of FIG. 2, administration console 20 further includes a server map 60, a controller map 62, and a LUN assignment map 64. Such maps can include, for example, data stored on a computer readable medium accessible by the platform on which administration console resides.

In operation, physical storage device 50 is mapped into logical storage devices 51 and 53. Servers 40 and 42 can transfer data to and from logical storage devices 51 and 53 through fabric 14 using fibre channel protocol. Further pursuant to fibre channel protocol, servers 40 and 42 can reference logical storage devices 51 and 53 through SCSI LUN addresses. In the embodiment of FIG. 2, such SCSI LUN addresses are referred to as LUN_1 (logical storage device 51) LUN_2 (logical storage device 52).

Further in operation, administration console 20 can interface with a user to assign logical storage devices 50 and 51 to servers 40 and 42. Administration console 20 sends instructions to masking engine 66 for associating a subset of logical storage devices 50 and 51 with a particular host, such as server 40 or 42. Then, when server 40 or 42 requests from storage controller 46 an identification of available logical storage devices, masking engine 66 can respond to the request by identifying the subset of logical storage devices as available. The following description includes a more detailed explanation of the operation of the present embodiment in order to accomplish such a result.

In the embodiment of FIG. 2, each adapter 41, 43, and 47 includes a world wide name (WWN) which is an eight byte unique identifier. The Institute of Electronics Engineers (IEEE) assigns blocks of WWNs to manufacturers so manufacturers can build fiber channel devices with unique WWNs. For illustrative purposes, in the embodiment of FIG. 2, adapter card 41 includes a WWN of "AAA", adapter 43 includes a WWN of "BBB," and adapter 47 includes a WWN of "CCC." Thus, the devices incorporating each adapter can be uniquely identified by other devices coupled to fabric 14.

A user, through user interface 65, can indicate to administration console 20 a desired mapping between servers 40 and 42 and logical storage devices 51 and 53. For example, assume a user wishes to assign logical storage device 51 (LUN_1) to server 40 (Server A) and logical storage device 52 (LUN_2) to server 42 (Server B). Administration console 20 includes server map 60 which includes a mapping of servers 40 and 42 and the associated WWNs of those servers. For example, server map 60 could include the information of Table 1, below.

TABLE 1

| Server | World Wide Name |
|---|---|
| Server A | AAA |
| Server B | BBB |

Administration console further includes a controller map 62 which includes a mapping of logical storage devices 51 20 and 53, and the associated WWN of storage controller 46 that controls logical storage devices 51 and 53. For example, referencing FIG. 2, controller map 62 could include the information of Table 2, below.

TABLE 2

| Controller (WWN) | Available Logical Storage (LUN) |
|---|---|
| CCC | LUN_1 |
|  | LUN_2 |

Administrator console 20, through communication with server map 60 and controller map 62 can inform a user through user interface 65 the servers available on SAN 24, and the LUNs available on SAN 24. The user then through user interface 65 can indicate to administration console 20 which servers a user desires to have access to which LUNs. With input from a user to determine which server should access which logical storage device, a LUN assignment map 64 can then be constructed that associates each server with a particular logical storage devices. For example, LUN assignment map 64 can include the information of Table 3, below.

TABLE 3

| Server (WWN) | Assigned Logical Storage (LUN) |
|---|---|
| AAA | LUN_1 |
| BBB | LUN_2 |

As can be appreciated, if one or both of servers 40 and 42 are operating in a WINDOWS NT environment, the above assignment is problematic without the use of masking engine 66 of the present disclosure. This is due to the characteristic of WINDOWS NT that a server operating under WINDOWS NT takes control of all available storage.

Therefore, instructions are sent to and received by masking engine 66 for associating a subset of the plurality of logical storage devices with a particular host coupled to the fabric. In the embodiment described with respect to FIG. 2, such instructions can include LUN assignment map 64.

As is commonly known, according to the fibre channel protocol, when a device is initialized and logs into fabric 14, the device is assigned a fibre channel ID. This ID is subject to change each time some initialization event occurs, such as a new device logging into fabric 14. In the embodiment of FIG. 2, the fabric has assigned fibre channel IDs as follows: server A (40) is S_ID_1, server B (42) is S_ID_2, and storage controller 46 is D_ID_1.

This fibre channel ID is used to communicate between devices through fabric 14. For example, a request by server A (40) addressed to storage controller 46 requesting an identification of available logical storage devices will be seen by storage controller 46 as coming from S_ID_1. However, the instructions received by masking engine 66 associate the LUNs under control of storage controller 46 with the WWNs of servers that will be accessing the logical storage devices 51 and 53 (see Table 3, LUN assignment map 64). Therefore, in the embodiment of FIG. 2, masking engine correlates the WWNs of the servers in assignment map 64 with the fibre channel ID's presently assigned to those servers. One embodiment of such a method is described with more particularity with respect to FIG. 4. After such a correlation, masking engine 66 constructs a permission table 67 associating the LUNs of logical storage devices 51 and 53 to the S_ID's of servers 40 and 42. Permission table 67 further associates only a subset of the total logical storage devices available to each server. For example, permission table 67 could include the information of Table 4.

TABLE 4

| Server (s_id) | Available Loqical Storage |
|---|---|
| s_id_1 | LUN_1 |
| s_id_2 | LUN_2 |

Masking engine 66 can use permission table 67 to prevent servers 40 and 42 from attempting to "take control" of logical storage devices 51 and 53, thus avoiding the problem of WINDOWS NT servers. For example, assume server A (40) makes a request of storage controller 46, requesting storage controller 46 to identify all available logical storage devices. Masking engine 66 identifies this request as originating from S_ID_1. Masking engine 66 then compares this address with permission table 67 and responds to the request by identifying only LUN_1. Server A (40) does not recognize the existence of LUN_2 (logical storage device 53), and thus server A (40) will not attempt to access LUN_2 (logical storage device 53). Thus, LUN_2 (logical storage device 53) has been "masked" from server A (40), thus avoiding all the potential problems such as device contention caused by WINDOWS NT servers on fabric 14. As can be seen, this was accomplished without specialized software installed on server A (40) or server B (42).

An alternative embodiment can replace permission table 67 with a plurality of mask sets. One mask set could be constructed for each of logical storage devices 51 and 53. Each mask set could include a mask for each of servers 40 and 42. Each mask would either allow access or disallow access. In such an embodiment, when a request for available storage was received from server 40 or server 42, the appropriate mask set would be applied to the request. The response to the request would include only the subset of logical storage devices to which permission should be granted to the originator of the request.

Figure 3:
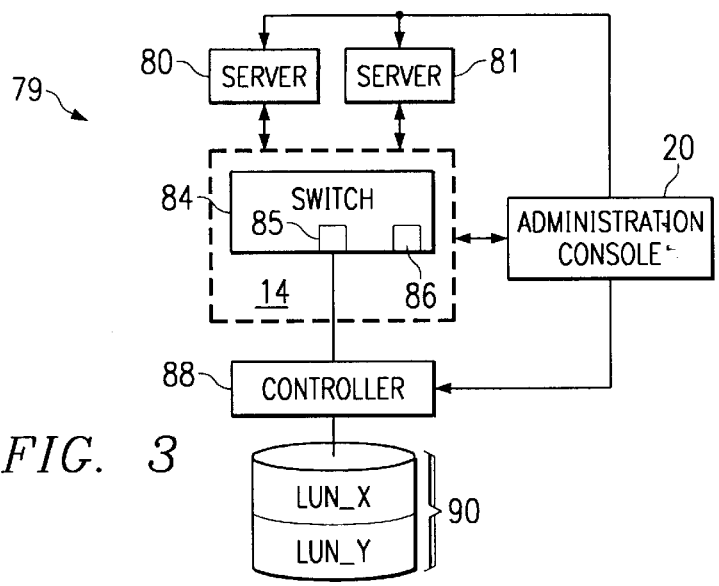
FIG. 3 is a component diagram of a storage area network including one embodiment of a switch having a masking engine.

FIG. 3 is a component diagram of a storage area network including one embodiment of a switch having a masking engine. In the embodiment of FIG. 3, SAN 79 includes servers 80 and 81 coupled to fabric 14. A storage controller 88 further couples to fabric 14 and physical storage device 90. Administration console 20 is coupled to fabric 14, controller 88, and servers 80, 81 as with described in previous figures.

The embodiment of FIG. 3 further includes switch 84. Switch 84 can include, for example, a computing device for establishing fabric 14. Such a computing device, as is commonly known, includes a CPU coupled to a computer readable medium. Such a switch 84 further includes a port 85 for interfacing to other computing devices to form a fibre channel network. Included with switch 84 is masking engine 86. Masking engine 86 performs the function as described with respect to masking engine 66 of FIG. 2. Namely, masking engine 86 can receive instructions from administration console 20 for associating a subset of the plurality of logical storage devices on physical storage device 90 to servers 80 and 81. Masking engine 86 can further recognize when one of servers 80 and 81 makes a request of storage controller 88 for identification of available logical storage devices. Masking engine 86 can then monitor and/or alter the response to such a request such that only a subset of available logical, storage devices is identified as available.

The embodiment of FIG. 3, similar to the; embodiment of FIG. 2, masks logical storage devices from particular servers attached to a SAN. As explained above, this allows for WINDOWS NT servers to attach to a fibre channel SAN without the need for specialized software installed on the server.

Figure 4:
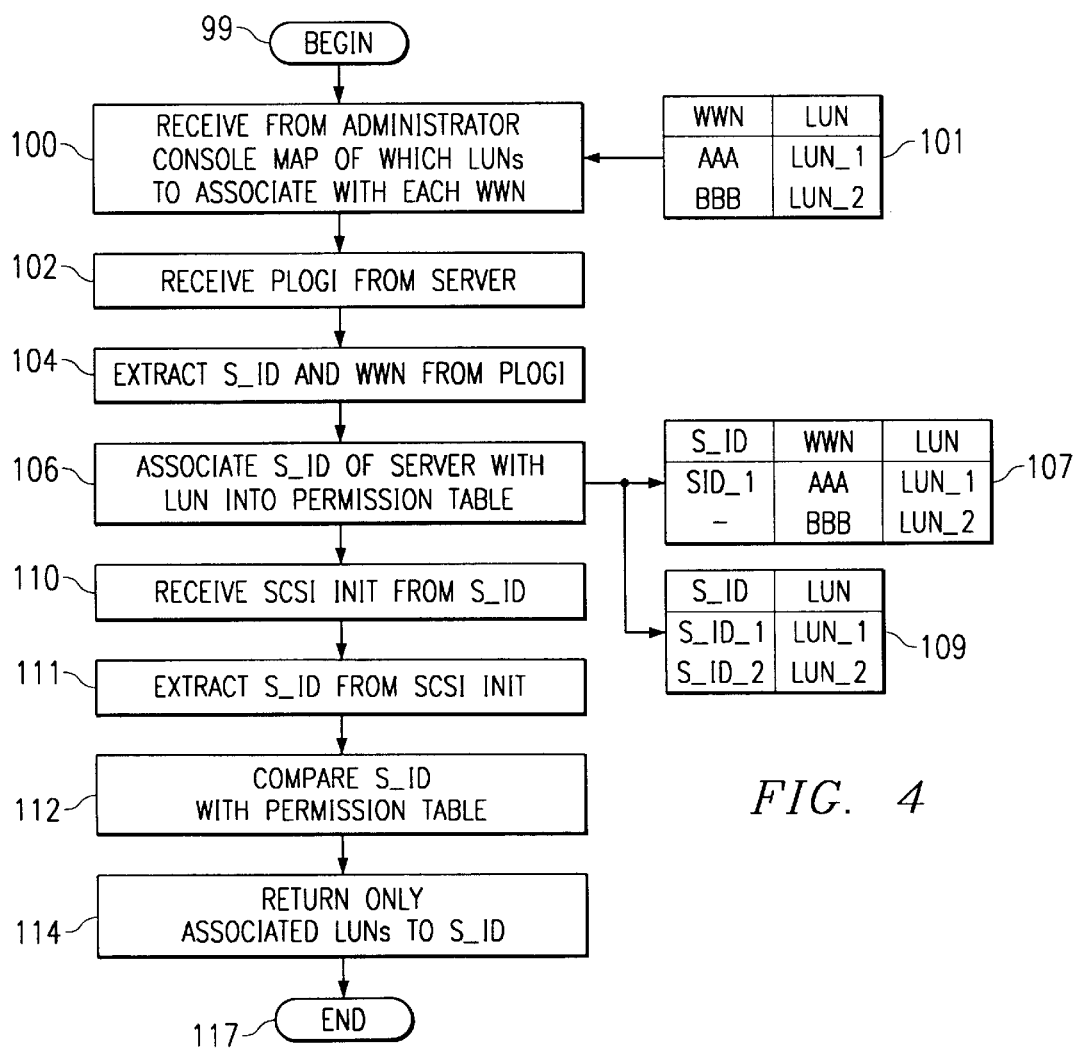
FIG. 4 is a flow diagram of one embodiment of a method for storage device masking in a storage area network.

FIG. 4 is a flow diagram of one embodiment of a method for storage device masking in a storage area network. The method of FIG. 4 can be implemented by a masking engine operating on a storage controller attached to a fabric of an SAN. For example, the method of FIG. 4 can be implemented by masking engine 66 of FIG. 2.

The method begins at step 99. At step 100, a LUN assignment map 101 is received that specifies which logical storage devices should be associated with each host that is attached to the fabric. In the method of FIG. 4, LUN assignment map 101 is indexed by the WWNs of the servers attached to the SAN and the LUNs of the logical storage devices under control of the storage controller. As such, in the method of FIG. 4, LUN assignment map 101 includes instructions for associating a subset of a plurality of logical storage devices with a particular host. Furthermore, the instructions identify the particular host by a World Wide Name and identify the subset by a LUN. LUN assignment map 101 is similar to LUN assignment map 64 of FIG. 2.

At step 102, a PLOGI command is received. As is known in the art, a PLOGI command is a fibre channel command wherein a server logs into a storage device attached to a SAN. With reference to the description of FIG. 2, a server executes a PLOGI command after the fabric has assigned a fibre channel ID (S_ID) to the server. As is also conventionally known, the S_ID of a server can be assigned any time a server executes a FLOGI command, which is the command used to log into the fabric.

At step 104, the S_ID of the server issuing the PLOGI command, as well as the WWN of the server executing the PLOGI command is extracted from the PLOGI command.

At step 106, the S_ID of the server issuing the PLOGI command is associated with the LUNs of LUN assignment map 101 into a permission table 109. For example, as shown by table 107, the WWN and S_ID of the server extracted from the PLOGI can be compared to the WWN and LUNs available to that WWN of LUN assignment map 101. This is done to correlate the S_ID and the LUNs available to that S_ID, which is incorporated into permission table 109. Permission table 109, as was the example used with respect to permission table 67 of FIG. 2, shows that LUN_1 is available to S_ID_1 and LUN_2 is available to S_ID_2.

At step 110, a SCSI initialization command is received from a server. A SCSI initialization command, as is generally known, includes a request for identification of available logical storage devices. Furthermore, the request is addressed as originating from the S_ID of the particular host (in this case a server) issuing the SCSI initialization command. At step 111, the S_ID is extracted from the request.

At 112, the S_ID is compared with permission table 109. This step obtains the LUN of the logical storage device that is available to the host that has issued the request. At step 114, only the LUNs associated with the S_ID of the particular host making the request are returned as available. Therefore, the other LUNs have been masked from the particular host making the request.

Various changes to the above embodiments are contemplated by the present disclosure. For example, although the permission tables of FIGS. 2 and 4 describe a one to one correspondence between the subset of logical storage devices available to each server, it is possible that various embodiments of the present disclosure do not include such a one to one correspondence. For example, one, all, several, or none of the available logical storage devices may be assigned to any particular server. In each of such cases, the masking engine of the disclosed embodiments would respond to the request for available storage from that particular server with the appropriate subset of available storage. Thus, the masking engine would mask from that particular server whichever logical devices that particular servers should not have access to.

Additionally, embodiments of the present disclosure can be implemented in SANs having any number of topologies. For example, there may be numerous storage controllers. In such a case, a masking engine would be present at each storage controller, and each would perform the functions of a masking engine as explained with respect to this disclosure.

Further embodiments of the present disclosure can include mapping functionality in addition to masking functionality. For example, mapping functionality could include allowing multiple hosts to observe different physical disks that have the same LUN. For example, a particular SAN may include 10 logical storage devices. With mapping functionality, a particular host may observe of the logical storage devices, designated as LUNs 0–4. Furthermore, a second host may observe the other 5 logical storage devices, wherein the other 5 logical storage device are also designaed LUNs 0–4. In such an embodiment, the designated LUNs can comprise "aliases" mapped to separate logical storage devices. Such an embodiment may be used, for example, to allow multiple boot disks, since LUN 0 is conventionally designated as the boot disk. Such mapping functionality could be performed, for example, by the masking engine of previous embodiments.

Although the disclosed embodiments have been described in detail, it should be understood that various changes, substitutions and alterations can be made to the embodiments without departing from their spirit and scope.

What is claimed is:

1. A method for masking logical storage devices from a host on a storage area network, the method comprising:
receiving instructions for associating a user-selected subset of a plurality of associated logical storage devices with a particular host from an administration console;
receiving a request from the particular, host operating in a Windows NT environment, the request for identification of available logical storage devices; and
responding to the request by identifying only the subset of logical storage devices as available, thereby masking the availability of the plurality of logical storage device not included in the user selected subset of the plurality of logical storage devices.

2. The method of claim 1, further comprising:
receiving a command from the particular host;
extracting from the command identifying information that uniquely identifies the particular host; and
using the identifying information and the instructions to perform the responding step.

3. The method of claim 2, wherein the responding step comprises providing a LUN of the subset.

4. The method of claim 3, wherein the receiving a command step comprises receiving a PLOGI command from the particular host.

5. The method of claim 4 wherein the extracting step comprises:
extracting a World Wide Name from the PLOGI command; and
extracting an S_ID from the PLOGI command.

6. The method of claim 5, wherein the instructions identify the particular host by a World Wide Name.

7. The method of claim 6, further comprising constructing a permissions table associating a LUN of the subset with the S_ID of the particular host.

8. The method of claim 7, wherein the receiving a request step comprises receiving a request for a LUN the request including an S_ID of the particular host, and wherein the method further comprises:
extracting the S_ID from the request;
comparing the S_ID with the permission table to obtain the LUN of the subset.

9. The method of claim 8, wherein the subset consists of one logical storage device.

10. A method for masking associated logical storage devices from a host on a storage area network, the method comprising:
receiving instructions for associating a user-selected subset of a plurality of logical storage devices with a particular host from an administration console, the instructions identifying the particular host by a World Wide Name, the instructions further identifying the subset by a LUN;
receiving a PLOGI command from the particular host operating in a Windows NT environment;
extracting the World Wide Name of the particular host from the PLOGI command;
extracting an S_ID associated with the particular host from the PLOGI command;
constructing a permissions table associating the LUN of the subset with the S_ID of the particular host;
receiving a request from the particular host, the request for identification of available logical storage devices, the request further including the S_ID of the particular host;
extracting the S_ID from the request;
comparing the S_ID with the permission table to obtain the LUN of the subset; and
responding to the request by identifying only the LUN of the subset, thereby masking the presence of the associated logical storage devices not include in the subset.

11. A storage controller comprising:
a CPU;
a computer readable medium coupled to the CPU;
an adapter coupled to the CPU, the adapter for interfacing to a fabric;
a storage interface coupled to the CPU, the storage interface for interfacing with a storage pool comprising a plurality of logical storage devices; and
a masking engine stored upon the computer readable medium, the masking engine comprising instructions operable to be executed by the CPU, the masking engine operable to:
  receive instructions from an administration console for associating a user selected subset of the plurality of logical storage devices associated with a particular host operating in a Windows NT environment, the host coupled to the fabric;
  receive a request from the particular host, the request for identification of available logical storage devices; and
  respond to the request by identifying only the subset of logical storage devices as available, thereby masking the presence of the associated logical storage devices not included in the subset.

12. The storage controller of claim 11, wherein the masking engine is further operable to:
  receive a command from the particular host;
  extract from the command identifying information that uniquely identifies the particular host; and
  use the identifying information and the instructions to respond to the request.

13. The storage controller of claim 12, wherein the command comprises a PLOGI command from the particular host.

14. The storage controller of claim 13, wherein the masking engine is further operable to:
  extract a World Wide Name from the PLOGI command; and
  extract an S_ID from the PLOGI command.

15. The storage controller of claim 14, wherein the instructions identify the particular host by a World Wide Name.

16. The storage controller of claim 15, further comprising a permission table stored on the computer readable medium, the permission table associating a LUN of the subset with the S_ID of the particular host.

17. The storage controller of claim 16, wherein the request comprises:
  a request for a LUN; and
  an S_ID of the particular host.

18. The storage controller of claim 11, wherein the masking engine is further operable to respond to the request by providing a LUN of the subset.

19. The storage controller of claim 11, wherein the storage pool comprises a plurality of physical storage devices.

20. The storage controller of claim 19, wherein the physical storage devices are arranged into one or more RAID volumes, each RAID volume assigned a unique LUN.

21. A storage subsystem comprising:
  a CPU;
  a computer readable medium coupled to the CPU;
  an adapter coupled to the CPU, the adapter for interfacing to a fabric;
  a storage interface coupled to the CPU;
  a physical storage device coupled to the storage interface, the physical storage devices operable to be arranged into a plurality of logical storage devices; and
  a masking engine stored upon the computer readable medium, the masking engine comprising instructions operable to be executed by the CPU, the masking engine operable to:
    receive instructions from an administration console for associating a user selected subset of the plurality of logical storage devices associated with a particular host operating in a Windows NT environment, the host coupled to the fabric;
    receive a request from the particular host, the request for identification of available logical storage devices; and
    respond to the request by identifying only the subset of logical storage devices as available, thereby masking the presence of the associated logical storage devices not included in the subset.

22. The storage subsystem of claim 21, wherein the physical storage device comprises a plurality of physical storage devices.

23. A fiber channel switch comprising:
  a CPU;
  a computer readable medium coupled to the CPU;
  a port coupled to the CPU, the port for interfacing to a computing device to form a fibre channel network; and
  a masking engine stored upon the computer readable medium, the masking engine comprising instructions operable to be executed by the CPU, the masking engine operable to:
    receive instructions from an administration console for associating a user-selected subset of a plurality of logical storage devices associated with a particular host operating in a Windows NT environment, the host coupled to the fibre channel network;
    receive a request from the particular host, the request for identification of available logical storage devices; and
    modifying a response to the request such that the response identifies only the subset of logical storage devices as available, masking any logical storage device associated with the particular host and not included in the subset.

24. A method for masking logical storage devices from a host on a storage area network, the method comprising:
  receiving instructions for associating a user-selected subset of a plurality of associated logical storage devices with a particular host from an administration console;
  receiving a request from the particular host, the request for identification of available logical storage devices; and
  responding to the request by identifying only the subset of logical storage devices as available, thereby masking the availability of the plurality of logical storage device not included in the user selected subset of the plurality of logical storage devices.

25. The method of claim 24, further comprising:
  receiving a command from the particular host;
  extracting from the command identifying information that uniquely identifies the particular host; and
  using the identifying information and the instructions to perform the responding step.

26. The method of claim 25, wherein the receiving a command step comprises receiving a PLOGI command from the particular host.

27. The method of claim 25 wherein the extracting step comprises:
  extracting a World Wide Name from the PLOGI command; and
  extracting a S_ID from the PLOGI command.

28. The method of claim 24, wherein the responding step comprises providing a LUN of the subset.

29. The method of claim 24, wherein the instructions identify the particular host by a World Wide Name.

30. The method of claim 24, further comprising constructing a permission table associating a LUN of the subset with the S_ID of the particular host.

31. The method of claim 24, wherein the receiving a request step comprises receiving a request for a LUN the request including an S_ID of the particular host, and wherein the method further comprises:
  extracting the S_ID from the request;

comparing the S_ID with the permission table to obtain the LUN of the subset.

32. The method of claim 24, wherein the subset consists of one logical storage device.

33. A method for masking logical storage devices from a host on a storage area network, the method comprising:
receiving instructions for associating a user-selected subset of a plurality of associated logical storage devices with a particular host from an administration console, the instructions identifying the particular host by a World Wide Name, the instructions further identifying the subset by a LUN;
receiving a PLOGI command from the particular host;
extracting the World Wide Name of the particular host from the PLOGI command;
extracting the S_ID associated with the particular host from the PLOGI command;
constructing a permissions table associating the LUN of the subset with the S_ID of the particular host;
receiving a request from the particular host, the request for identification of available logical storage devices, the request further including the S_ID of the particular host;
extracting the $S_{13}$ ID from the request;
comparing the $S_{13}$ ID with the permission table to obtain the LUN of the subset; and
responding to the request by identifying only the LUN of the subset, thereby masking the presence of the associated logical storage devices not include in the subset.

34. A storage controller comprising:
a CPU;
a computer readable medium coupled to the CPU;
a adapter coupled to the CPU, the adapter for interfacing to a fabric;
a storage interface coupled to the CPU, the storage interface for interfacing with a storage pool comprising a plurality of logical storage devices; and
a masking engine stored upon the computer readable medium, the masking engine comprising instructions operable to be executed by the CPU, the masking engine operable to:
receive instructions from an administration console for associating a user-selected subset of the plurality of logical storage devices associated with a particular host, the host coupled to the fabric;
receive a request from the particular host, the request for identification of available logical storage devices; and
respond to the request by identifying only the subset of logical storage devices as available, thereby masking the presence of the associated logical storage devices not included in the subset.

35. The storage controller of claim 34, wherein the masking engine is further operable to:
receive a command from the particular host;
extract from the command identifying information that uniquely identifies the particular host; and
use the identifying information and the instructions to respond to the request.

36. The storage controller of claim 34, wherein the command comprises a PLOGI command from the particular host.

37. The storage controller of claim 36, wherein the masking engine is further operable to:
extract a World Wide Name from the PLOGI command; and
extract an S_ID from the PLOGI command.

38. The storage controller of claim 34, wherein the instructions identify the particular host by a World Wide Name.

39. The storage controller of claim 34, further comprising a permission table stored on the computer readable medium, the permission table associating a LUN of the subset with the S_ID of the particular host.

40. The storage controller of claim 34, wherein the request comprises:
a request for a LUN; and
an S_ID of the particular host.

41. The storage controller of claim 34, wherein the masking engine is further operable to respond to the request by providing a LUN of the subset.

42. The storage controller of claim 34, wherein the storage pool comprises a plurality of physical storage devices.

43. The storage controller of claim 42, wherein the physical storage devices are arranged into one or more RAID volumes, each RAID volume assigned a unique LUN.

44. A storage subsystem comprising:
a CPU;
a computer readable medium coupled to the CPU;
an adapter coupled to the CPU, the adapter for interfacing to a fabric;
a storage interface coupled to the CPU;
a physical storage device coupled to the storage interface, the physical storage devices operable to be arranged into a plurality of logical storage devices; and
a masking engine stored upon the computer readable medium, the masking engine comprising instructions operable to be executed by the CPU, the masking engine operable to:
receive instructions from an administration console for associating a user-selected subset of the plurality of logical storage devices associated with a particular host, the particular host coupled to the fabric;
receive a request from the particular host, the request for identification of available logical storage devices as available, thereby masking the presence of the associated logical storage devices not included in the subset.

45. The storage subsystem of claim 44, wherein the physical storage device comprises a plurality of physical storage devices.

46. A fiber channel switch comprising:
a CPU;
a computer readable medium coupled to the CPU;
a port coupled to the CPU, the port for interfacing to a computing device to a form a fibre channel network; and
a masking engine stored upon the computer readable medium, the masking engine comprising instructions operable to be executed by the CPU, the masking engine operable to:
receive instructions from an administration console for associating a user-selected subset of a plurality of logical storage devices associated with a particular host, the particular host coupled to the fibre channel network;
receive a request from the particular host, the request for identification of available logical storage devices; and
modifying a response to the request such that the response identifies only the subset of logical storage devices as available, thereby masking any logical storage device associated with the particular host and not included in the subset.

* * * * *